United States Patent [19]

Inoue et al.

[11] Patent Number: 4,645,042
[45] Date of Patent: Feb. 24, 1987

[54] HYDRAULIC DAMPER

[75] Inventors: Masaru Inoue; Masahiro Ashiba, both of Kanagawa, Japan

[73] Assignees: Jidosha Denki Kogyo Kabushiki Kaisha; Tokico Ltd., both of Kanagawa, Japan

[21] Appl. No.: 683,552

[22] Filed: Dec. 19, 1984

[30] Foreign Application Priority Data

Dec. 21, 1983 [JP] Japan .................. 58-196541[U]

[51] Int. Cl.$^4$ .............................................. F16F 9/34
[52] U.S. Cl. ...................................... 188/319; 74/526; 74/818; 188/299; 192/142 R; 251/129.12; 280/707; 280/714
[58] Field of Search ............................. 188/319, 299; 251/129.12; 192/142 R; 280/707, 714; 74/526, 818

[56] References Cited

U.S. PATENT DOCUMENTS

| | | | |
|---|---|---|---|
| 1,520,233 | 12/1924 | Gabriel | 74/526 |
| 2,044,025 | 6/1936 | Windas | 251/129.12 X |
| 3,206,117 | 9/1965 | Anderson et al. | 251/129.12 X |
| 3,680,831 | 8/1972 | Fujiwara | 251/129.12 |
| 3,870,274 | 3/1975 | Broe | 251/129.12 |
| 4,313,529 | 2/1982 | Kato et al. | 188/319 X |
| 4,463,839 | 8/1984 | Ashiba | 188/319 X |

FOREIGN PATENT DOCUMENTS

| | | | |
|---|---|---|---|
| 437216 | 6/1948 | Italy | 192/142 R |
| 1006265 | 9/1965 | United Kingdom . | |
| 2016647 | 10/1982 | United Kingdom . | |
| 2112104 | 7/1983 | United Kingdom . | |

Primary Examiner—George E. A. Halvosa
Attorney, Agent, or Firm—Wenderoth, Lind & Ponack

[57] ABSTRACT

A hydraulic damper of adjustable damping force type includes a piston working in a cylinder and partitioning the interior of the cylinder into two liquid chambers, a piston rod with one end being connected to the piston and the other end extending to the outside of the cylinder, a liquid passage formed in the piston rod for connecting the two liquid chambers, an opening adjusting member rotatably disposed in the liquid passage for selectively adjusting the effective passage area of the liquid passage between at least three different passage area conditions, and an actuating device for reciprocatingly rotating the adjusting member between two extreme positions and one or more intermediate positions corresponding to respective passage area conditions. Two fixed stops are provided to stop the adjusting member at respective extreme positions, and a movable stop is provided to stop the adjusting member at an intermediate position. The location of the movable stop is determined in connection with either one of the extreme positions.

5 Claims, 16 Drawing Figures

B CONDITION
A CONDITION
Fig. 6(iii)
A CONDITION
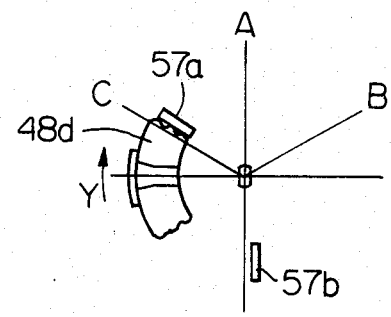
C CONDITION

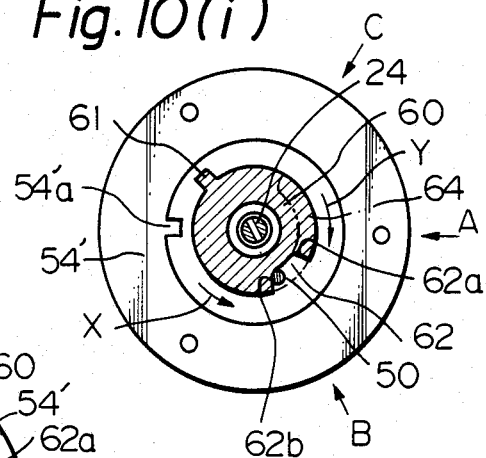
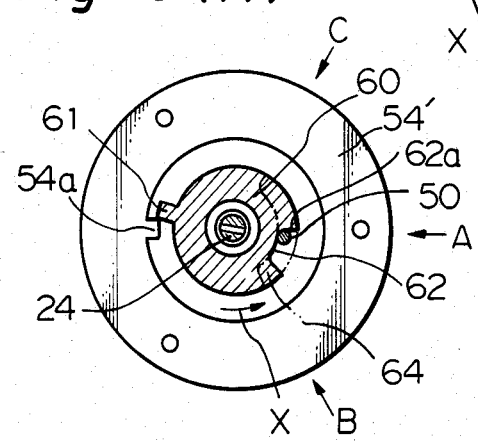
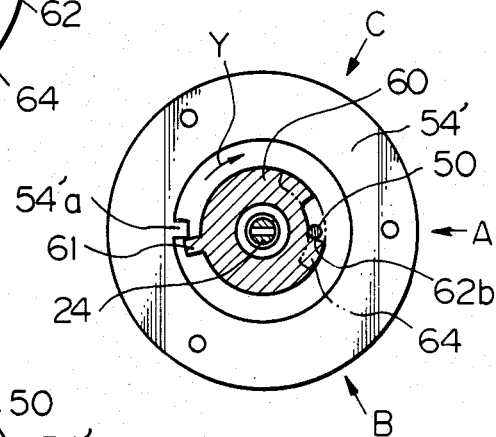
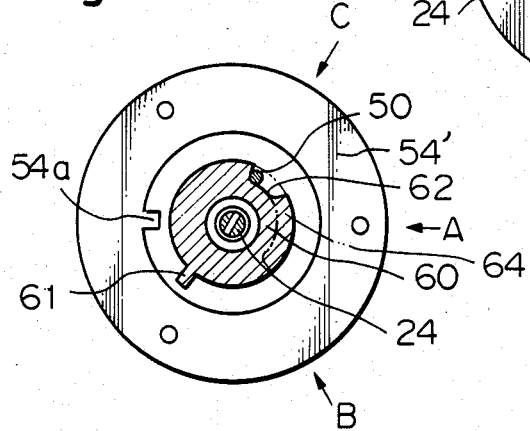
Fig. 10(i) Fig. 10(ii) Fig. 10(iii) Fig. 10(iv)

HYDRAULIC DAMPER

BACKGROUND OF THE INVENTION

This invention relates to a hydraulic damper of the adjustable damping force type.

One prior art hydraulic damper of adjustable damping force type includes a piston working in a cylinder and partitioning the interior of the cylinder into two liquid chambers, a piston rod with one end being connected to the piston and the other end extending to the outside of the cylinder, a liquid passage formed in the piston rod for connecting the two liquid chambers, an opening adjusting member movably disposed in the liquid passage for selectively adjusting the effective passage area of the liquid passage between at least three different passage area conditions, and an actuating device for reciprocatingly moving the adjusting member between two extreme positions and one or more intermediate positions corresponding to respective passage area conditions.

The actuating device is required to move the adjusting member quickly and accurately to respective passage area conditions. Particularly, it is very difficult to stop the adjusting member at intermediate positions.

SUMMARY OF THE INVENTION

The present invention has been made in view of the aforesaid circumstances and, according to the invention, a stop member is displaceably provided to cooperate with a member associated with the actuating device for stopping the adjusting member at an intermediate position.

According to a preferred embodiment of the invention, the opening adjusting member is a rotatable shutter for selectively opening a plurality or orifice openings which define the effective passage area of the liquid passage, and the actuating device includes a rotary actuator, a reduction gear mechanism connected to an output shaft of the rotary actuator, a reciprocally rotatable member connecting the reduction gear mechanism with the rotatable shutter, two fixed stops for engaging with the rotatable member to define two respective extreme positions of the shutter, an electro-magnet, an abutting member associated with the electro-magnet and adapted to engage, when the electro-magnet is energized, with the rotatable member to define the intermediate position of the shutter.

BRIEF DESCRIPTION OF THE DRAWINGS

Further objects and effects of the invention will become apparent from the following detailed description relative to the accompanying drawings exemplifying two preferred embodiments of the invention, and in which;

FIGS. 10(i)–10(iv) are schematic views showing operational conditions of the mechanism of FIG. 8.

DETAILED DESCRIPTION OF THE PREFERRED EMBODIMENTS

Figure 1:
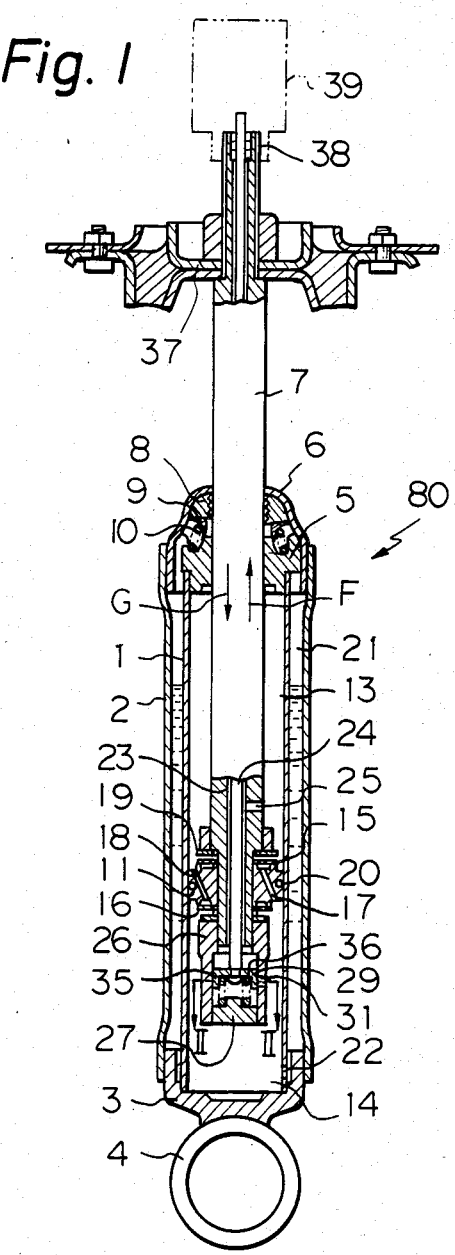
FIG. 1 is a longitudinal sectional view of a hydraulic damper according to the invention.

The hydraulic damper shown in FIG. 1 comprises an inner tube 1 acting as a cylinder, a coaxial outer tube 2 surrounding the inner tube 1, a cap 3 secured to first ends of the inner and outer tubes 1 and 2, a mounting ring 4 secured to the cap 3 for mounting the hydraulic damper on such as a wheel axle of a vehicle, a rod guide 5 secured to the other end of the inner tube 1, and a cap 6 secured to the other end of the outer tube 2. A piston rod 7 extends through the rod guide 5 and the cap 6. A seal 8 is disposed on the inner surface of the cap 6 and surrounds sealingly and slidably the piston rod 7. A check valve 9 and a spring 10 are interposed between the seal 8 and the rod quide 5.

A piston 11 is connected to the inner end of the piston rod 7 and partitions the interior of the inner tube 1 into two liquid chambers 13 and 14. Passages 17 and 18 are formed in the piston 11 to extend therethrough and are respectively opened and closed by disc valves 15 and 16 which are disposed on opposite surfaces of the piston 11. Normally, the disc valves 16 and 17 are closed, and when the pressure difference between chambers 13 and 14 exceeds a predetermined level either one of the disc valves 16 and 17 resiliently deflects to communicate both chambers. Further, a fixed orifice (not shown) is provided in the piston 11 to permanently communicate chambers 13 and 14. Shown at 19 is a washer and at 20 is a seal ring.

An annular chamber 21 defined between inner and outer tubes 1 and 2 is communicated with the liquid chamber 14 through an opening 22 formed in one end of the inner tube 1. The chambers 13 and 14 and the lower portion of the chamber 21 contain hydraulic liquid, and the upper portion of the chamber 21 contains gas under pressure.

A coaxial bore 23 is formed in the piston rod 7 to extend therethrough, and a connecting rod 24 is rotatably disposed in the bore 23. A radial hole 25 is formed in the circumferential wall of the piston rod 7 to communicate permanently the bore 23 with the liquid chamber 13. A tubular member 26 is screw threadingly connected to the inner end of the piston rod 7 and also acts as a nut for securing the piston 11 to the piston rod 7. A cover plate 27 is secured to the tubular member 26 to close the open end of the tubular member 27.

Figure 2:
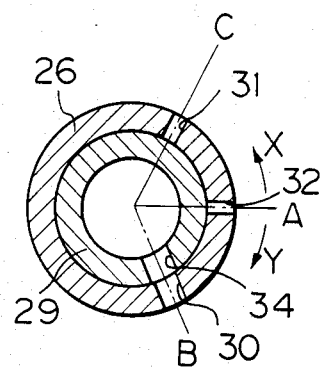
FIG. 2 is an enlarged sectional view taken along line II—II in FIG. 1.

A shutter 29 is secured to the connecting rod 24 and is rotatable in the tubular member 26. A plurality of orifices 30, 31 and 32 are formed in the circumferential wall of the tubular member 26 as shown in FIG. 2 to cooperate with the shutter 29. When the shutter 29 is rotated through the connecting rod 24, a radial opening 34 formed in the shutter 29 selectively opens and closes the orifices 30, 31 and 32. The orifices 30, 31 and 32 are circumferentially spaced respectively by 60 degrees and the effective areas thereof are sequentially decreased in the order of 30, 31 and 32. The opening 34 is larger than the largest orifice 30 and is smaller than the distance between the orifices 30 and 32. A spring 35 is disposed between the cover plate 27 and the shutter 29 to bias the shutter 29 upward in FIG. 1. One or more axial openings 36 are formed in the shutter 29 to communicate the bore 23 in the piston rod 7 with either of the orifices 30, 31 and 32 through the opening 34 and, accordingly, to communicate the chambers 13 and 14. Namely, the radial hole 25 and axial bore 23 in the piston rod 7, the axial opening 36 and the radial opening 34 in the shutter 29, and orifices 30, 31 and 32 in the tubular member 26 cooperate to constitute a liquid passage communicating chambers 13 and 14 by-passing disc valves 15 and 16.

The outer end of the piston rod 7 projecting outside of the outer tube 2 is connected to a body member of the vehicle through a mounting mechanism 37. A seal 38 is disposed in the upper end portion of the bore 23 to seal the connecting rod 24. A rotating mechanism 39 for rotating the connecting rod 24 is mounted on the upper end of the piston rod 7.

FIGS. 3-6 show the details of the rotating mechanism 39. The mechanism 39 comprises a casing 40 consisting of a generally cylindrical body 40a, a bottom member 40b mounted on the projecting end of the piston rod 7 (not shown in FIG. 3), and a cover plate 40c, and a reversible motor 41 mounted on the cover plate 40c. A pinion 44 is connected to output shaft 43 of the motor 41. The pinion 44 is drivingly connected through intermediate gears 45 and 46 to a stopper gear 48 having a roughly butterfly shape in a plan view of FIG. 4. The stopper gear 48 has a gear teeth portion 48a extending circumferentially about 180 degrees, a shaft portion 48b rotatably supporting the stopper gear and connected to the connecting rod 24, a radially outwardly extending portion 48c extending opposite from the gear teeth portion 48a, and abutting rubber members 48d mounted on circumferentially opposite ends of the portion 48c. The abutting rubber members 48d define a predetermined arcuate range therebetween (about 60 degrees in the embodiment shown in FIG. 4).

An electro-magnet consisting of a coil 52 and a magnetic pole piece 53 is disposed in the bottom member 40b of the casing 40 to cooperate with an annular plate 54. The annular plate 54 is rotatably and vertically displaceably mounted on the shaft portion 48b of the stopper gear 48 and is normally biased by a spring 56 toward a position separating from the electro-magnet. When the electro-magnet is energized, the rotation of the annular plate is prevented. An arcuate plate 57 having vertically extending abutting pieces 57a and 57b on opposite circumferential ends is secured to the annular plate 54 by such as welding or the like. Stationary abutting rubber members 58a and 58b are embedded in the cylindrical body 40a of the casing 40 to abut with respective of the abutting pieces 57a and 57b thereby restricting the rotation of the annular plate 54.

Referring to FIG. 2 it is assumed that in condition A the smallest orifice 32 is communicated with the opening 34 in the shutter 29 (the effective passage area of the orifice is the minimum to generate a relatively high damping force and thus the damper is at a hard condition), that in condition B (when the shutter 29 is rotated by 60 degrees from condition A in the direction of arrow Y) the maximum orifice 30 is communicated with the opening 34 in the shutter 29 thereby generating a minimum damping force and the damper is at a soft condition, and that in condition C (the shutter 29 is rotated by 60 degrees from the condition A in the direction of arrow X), the medium orifice 31 is opened thereby generating a medium damping force and the damper is at a medium condition.

According to the invention the rotation of the shutter 29 is accuarately controlled between conditions A, B and C.

Figure 6I:
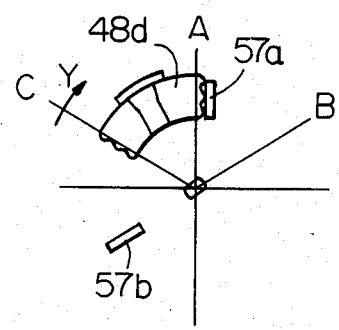
FIGS. 6(i)–6(iv) are schematic views showing operational conditions of the mechanism of FIG. 3.
Figure 6:
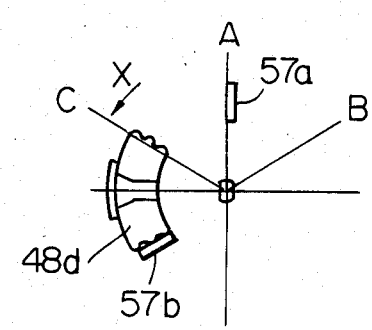
Figure 6:
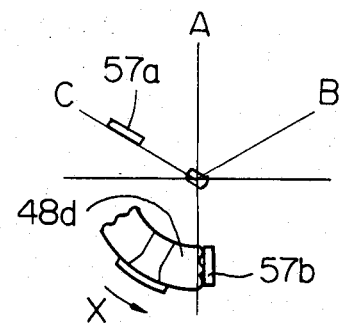

FIG. 6(i) shows the B condition, namely, when the stopper gear 48 is rotated in the Y direction with the electro-magnet being de-energized, the stopper gear 48 and the annular plate 54 will freely rotate until the abutting piece 57a secured to the annular plate 54 is clamped between the stationary rubber member 58a and the abutting rubber member 48d of the stopper gear 48. The shutter 29 is accurately located at condition B. Similarly, FIG. 6(iv) shows the condition C. The shutter 29 can accurately be located at condition C by clamping abutting piece 57b between the abutting rubber member 48d and the abutting rubber member 58b. FIG. 6(ii) shows condition A which is attained by rotating the shutter 29 in the X direction from condition B. In this case, the electro-magnet is energized and the annular plate 54 is maintained at the position defined by condition B. The stopper gear 48 can rotate until the abutting rubber 48d abuts with the abutting piece 57b as shown. FIG. 6 (iii) shows condition A which is attained by rotating the stopper gear 48 in the Y direction from condition C with the electro-magnet being energized. The condition A is determined by abutment between the rubber member 48d and the abutting piece 57a.

To prevent the rotation of the annular plate 54 in the energized condition of the electro-magnet, there are provided at least one projection 54a on the lower surface of the annular plate 54 and two or more circumferentially spaced recesses 54b in the bottom member 40b of the casing 40.

Figure 7:
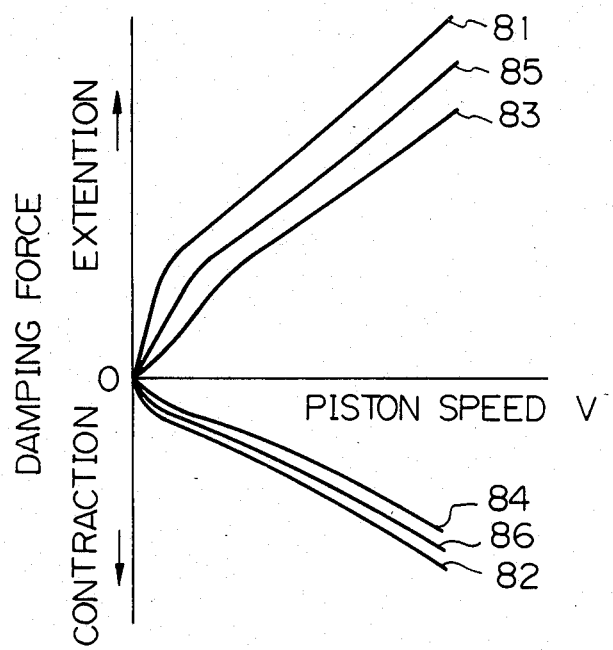
FIG. 7 is a diagram of damping force characteristics.

FIG. 7 shows the damping force characteristics. The hard condition (condition A) is depicted by lines 81 and 82, the soft condition (condition B) is depicted by lines 83 and 84, and the medium condition (condition C) is depicted by lines 85 and 86.

Figure 8:
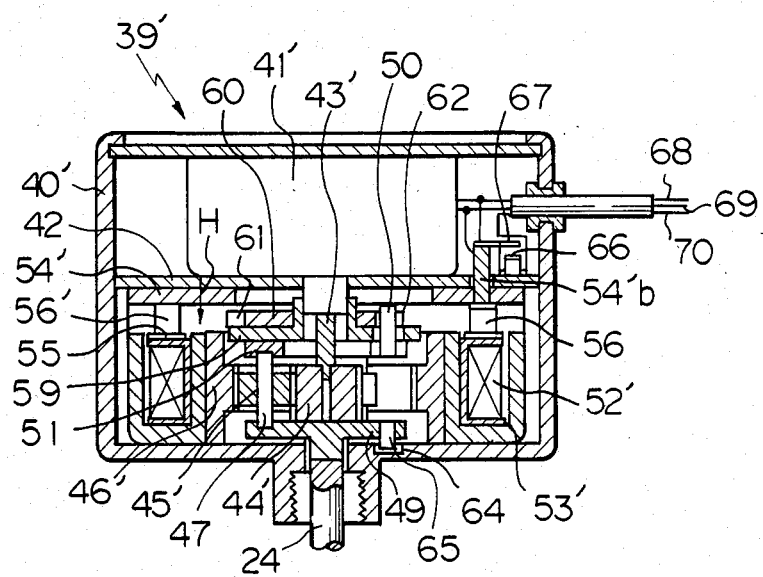
FIG. 8 is a view similar to FIG. 3 but of a second embodiment of the rotating mechanism.
Figure 9:
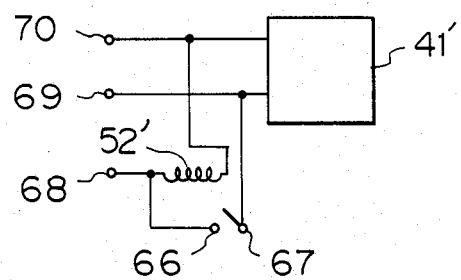
FIG. 9 is a wiring diagram.

FIGS. 8-10 illustrate a modified form of the rotating mechanism. The parts similar to the first embodiment are denoted by the same reference numerals with primes being attached thereto. A supporting plate 42 is provided in a casing 40' to divide the interior of the casing 40' into a motor chamber for receiving the motor 41' and a chamber for receiving mechanical parts, and to mount thereon the motor 41'. A pinion 44' is secured to an output shaft 43' of the motor 41' and engages with one or more planet gears 45' which, in turn, engage with a large stationary internal gear 46'. The pinion 43' and gears 45' and 46' constitute a planetary gear mechanism. A shaft 47 of the planet gear 45' is supported on a rotary plate 49 and on an annular plate 51. The rotary plate 49 is drivingly connected to the connecting rod 24, and has a pin 65 which is received in an arcuate groove 64 formed in the inner surface of the casing 40' thereby defining the range of the rotary movement of the rotary plate 49. Thus, conditions B and C are determined. A pin 50 is mounted on the annular plate 51. An annular plate 60 having a projection 61 on the outer circumference and an arcuate recess 62 in the outer circumferentual portion is relatively rotatably supported on an annular retainer 59 which is integrally rotatable with the annular plate 51. The recess 62 defines on circumferential opposite ends thereof abutting surfaces 62a and 62b for cooperating with the pin 50 as explained hereinafter.

Figure 3:
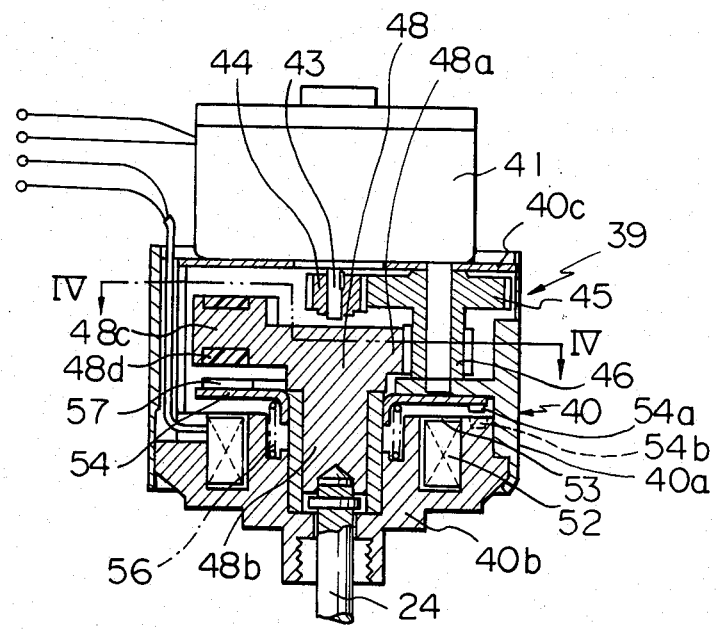
FIG. 3 is an enlarged sectional view of a rotating mechanism shown in FIG. 1.
Figure 4:
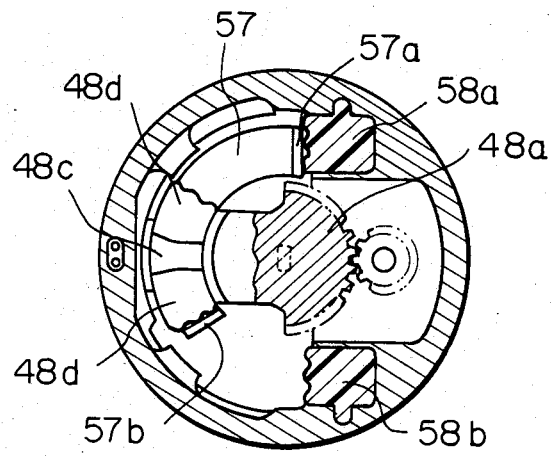
FIG. 4 is a sectional view taken along line IV—IV in FIG. 3.
Figure 5:
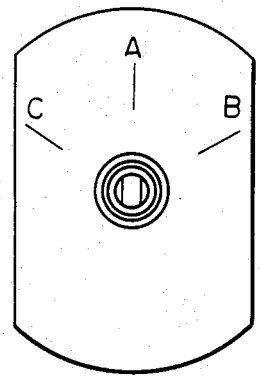
FIG. 5 is a bottom view of the mechanism of FIG. 3.

An electro-magnet consisting of coil 52' and magnetic pole piece 53' cooperates with annular plate 54' which is biased by spring 56' in a direction separating from the electro-magnet, generally similarly to the embodiment of FIG. 3. A projection 54'a is formed on the inner circumference of the annular plate 54' to cooperate with the projection 61 on the annular plate 60 in the energized condition of the electro-magnet thereby locating the annular plate as shown in FIGS. 10(ii) and 10(iii).

It will be understood that the annular plate 54' is nonrotatably mounted and is displaceable only in the vertical direction. A pin 54'b is mounted on the plate 54' and passes through the supporting plate 42. A fixed electric contact 66 cooperates with a movable electric contact 67 mounted on the pin 54'b. The contact 66 is connected to one end of the coil 52' and a terminal 68, the contact 67 is connected to the motor 41' and a terminal 69, and the other end of the coil 52' is connected to the motor 41' and a terminal 70.

The operation of the second embodiment is generally similar to the first embodiment shown in FIG. 3 through FIG. 6 and detailed description therefor is omitted.

In locating the shutter at condition B or C, the motor 41' is actuated by supplying electric current between terminals 69 and 70. The electro-magnet is in the deenergized condition and the rotation of the motor 41' is terminated when the pin 65 engages with either of the circumferential ends of the arcuate groove 64. FIGS. 10(i) and 10 (iv) illustrate respectively conditions B and C.

To rotate the rod 24 into condition A from either of conditions B and C, electric current is supplied between terminals 68 and 70. The electro-magnet is firstly energized and the plate 54' takes a position to cooperate with the plate 60, and thereafter, the contacts 66 and 67 contact to energize the motor 41'. The plate 60 rotates in the direction of X from the position of FIG. 10(i) to the position of FIG. 10(ii). The rod 24 accurately rotates from condition B to condition A.

As described heretofore, according to the invention, the shutter 29 can reliably and accurately be located at conditions A, B and C as desired and operations to change such conditions can be performed very quickly.

Although the embodiments show three conditions A, B and C, the invention may be applied to hydraulic dampers having four or more adjusting steps or conditions.

According to the embodiments illustrated, two extreme conditions C and B are defined as intermediate and large passage area positions respectively and the intermediate condition A is defined as the smallest passage area position which defines the maximum damping force condition or a hard condition of the damper. Thus, the time for returning the damper to the hard condition from the medium or soft condition can be reduced to a minimum, which is advantageous for safety reasons.

What is claimed is:

1. In a hydraulic damper including a piston working in a cylinder and partitioning the interior of the cylinder into two liquid chambers, a piston rod having a first end connected to said piston and a second end extending to the outside of said cylinder, a liquid passage formed in said piston rod for connecting said two liquid chambers, an opening adjusting member movably disposed in said liquid passage for selectively adjusting the effective passage area of said liquid passage between at least three different passage area conditions, and actuating means for reciprocatingly moving said adjusting member between two extreme positions and at least one intermediate position corresponding to respective said passage area conditions, the improvement wherein said actuating means comprising:

a rotary actuator;
a reciprocably rotatable member connected to said adjusting member and driven by said rotary actuator;
two fixed stop means for engaging with said rotatable member corresponding to said two extreme adjusting positions;
at least one axially displaceable member displaceable in a direction parallel to the rotary axis of said rotatable member between a first position cooperating with and stopping rotary movement in respective given directions from either of said extreme adjusting positions of said rotatable member to define an intermediate position corresponding to said intermediate adjusting position and a second position permitting rotation of said rotatable member in said given directions;
means for displacing axially said axially displaceable member between said first and second positions thereof; and
means for preventing movement of said axially displaceable member in the circumferential direction at least when said axially displaceable member is in said first position thereof.

2. The improvement claimed in claim 1, wherein said opening adjusting member comprises a reciprocably rotatable shutter for selectively adjusting said effective passage area between three different passage area conditions, and the smallest passage area condition corresponds to said intermediate adjusting position of said shutter.

3. The improvement claimed in claim 1, wherein said rotary actuator comprises an electric motor, and said means for displacing said axially displaceable member comprises an electromagnet.

4. The improvement claimed in claim 3, wherein said preventing means comprises means for mounting said axially displaceable member non-rotatably.

5. The improvement claimed in claim 3, wherein said axially displaceable member is mounted rotatably, and said preventing means comprises means for blocking rotation of said axially displaceable member when the same is in said first position thereof.

* * * * *